(12) United States Patent
Ogawa

(10) Patent No.: US 7,800,362 B1
(45) Date of Patent: Sep. 21, 2010

(54) PRESSURE DISTRIBUTION DETECTOR UTILIZING ELECTROMAGNETIC COUPLING

(75) Inventor: Yasuji Ogawa, Tsukuba (JP)

(73) Assignees: Xiroku, Inc., Tsukuba-shi, Ibaraki (JP); Newcom, Inc., Tsukuba-shi, Ibaraki (JP)

( * ) Notice: Subject to any disclaimer, the term of this patent is extended or adjusted under 35 U.S.C. 154(b) by 300 days.

(21) Appl. No.: 12/161,439

(22) PCT Filed: Dec. 6, 2006

(86) PCT No.: PCT/JP2006/324328

§ 371 (c)(1),
(2), (4) Date: Jul. 18, 2008

(87) PCT Pub. No.: WO2007/083453

PCT Pub. Date: Jul. 26, 2007

(30) Foreign Application Priority Data

Jan. 19, 2006 (JP) .............................. 2006-011748
Aug. 28, 2006 (JP) .............................. 2006-231225

(51) Int. Cl.
*G01B 7/24* (2006.01)
*G01L 1/12* (2006.01)
*G01R 33/18* (2006.01)

(52) U.S. Cl. ................ 324/209; 324/207.15; 73/862.69; 73/862.626

(58) Field of Classification Search ................ 324/207.15–207.17, 209, 228; 73/862.046, 73/862.69, 862.625–862.626
See application file for complete search history.

(56) References Cited

U.S. PATENT DOCUMENTS

2003/0141867 A1    7/2003    Inoue

FOREIGN PATENT DOCUMENTS

| EP | 1 698 874 | 6/2006 |
|----|-----------|--------|
| JP | 57-100331 | 12/1980 |
| JP | 57-165849 | 5/1984 |
| JP | 62-226030 | 3/1986 |
| JP | 09-113203 | 10/1995 |
| JP | 2003-294547 | 10/2003 |
| JP | 2005-156474 | 6/2005 |

*Primary Examiner*—Bot L LeDynh
(74) *Attorney, Agent, or Firm*—Wells St. John PS

(57) ABSTRACT

A pressure distribution detector is less influence by installation environment, that is, a pressure distribution detector that detection sensitivity or detection accuracy is less adversely affected even if the device is fitted not only to a flat surface but also a surface having an arbitrary shape such as a curved surface. The pressure distribution detector comprises a plurality of drive coils (1) provided on a substrate, a plurality of detection coils (2) electromagnetically coupled with the plurality of drive coils in pairs respectively, and a spacer (4) for keeping a constant distance between the plurality of drive coils and the plurality of detection coils, respectively. In order to vary the degree of electromagnetic coupling between the drive coil and the detection coil, a variable electromagnetic coupling (3) formed of a conductor or a magnetic body is provided movably adjacent to the drive coil and/or the detection coil. The drive coil is driven through a drive circuit and a change in the degree of electromagnetic coupling between the drive coil and the detection coil is detected by a detection circuit from the detection coil.

22 Claims, 7 Drawing Sheets

(a)

(b)

(a)

(b)

(a)

(b)

(a)

(b)

PRESSURE DISTRIBUTION DETECTOR UTILIZING ELECTROMAGNETIC COUPLING

CROSS REFERENCE TO RELATED APPLICATION

This is a 35 U.S.C. §371 application of and claims priority to PCT International Application No. PCT/JP/2006/324328, which was filed Dec. 6, 2006, and which claims priority to Japanese Patent Application No. 2006-231225, which was filed Aug. 28, 2006, and which claims priority to Japanese Patent Application No. 2006-011748, which was filed Jan. 19, 2006, and the teachings of all the applications are incorporated herein by reference.

TECHNICAL FIELD

The present invention relates to a pressure distribution detector utilizing electromagnetic coupling caused by coils and, more particularly to a pressure distribution detector that keeps a constant distance between a drive coil and a detection coil and is less influenced by the installation environment.

BACKGROUND ART

A pressure distribution detector has widely been used in various fields such as seat pressure detection of vehicles such as a car, welfare devices such as a bed, medical or sports devices for measuring weight distribution during walking, artificial skin of robots, and man-machine interfaces of a computer or game instrument.

As a device for measuring a pressure and displacement amount, there is known one using a differential transformer as disclosed in Patent Document 1. This device adopts a system that uses a core and a differential coil to detect the relative change amount between them. However, the core and the differential coil each have a certain degree of thickness, so that it is difficult to form the mechanism in a thin sheet-like shape. Accordingly, it is difficult to realize a sheet-like pressure measurement device by utilizing the above system.

As a pressure distribution detector which is formed into a thin sheet-like shape, there can be exemplified one using a pressure-sensitive rubber as disclosed in Patent Document 2 and one using electrostatic coupling as disclosed in Patent Document 3. These pressure distribution detectors have comparatively high impedance, so that they are susceptible to noise, and, therefore, it is difficult to increase the size of the detection surface thereof.

As a device that can measure the pressure distribution by using electromagnetic coupling caused by coils, there can be exemplified one disclosed in Patent Document 4 proposed by the present inventor. This is a system that provides a cushion material between a drive coil to which an oscillator is connected and a detection coil to which a detection circuit is connected and measures a change in the electromagnetic coupling caused by a change in the distance between the drive coil and the detection coil. The system of Patent Document 4 using the electromagnetic coupling caused by coils has a high tolerance for noise because of low impedance, and can be formed into a sheet-like shape, and the size of the detection surface can be larger.

Patent Document 1: Japanese Patent Application Kokai Publication No. Hei 09-113203

Patent Document 2: Japanese Patent Application Kokai Publication No. Sho 57-100331

Patent Document 3: Japanese Patent Application Kokai Publication No. Sho 62-226030

Patent Document 4: Japanese Patent Application Kokai Publication No. 2005-156474

DISCLOSURE OF THE INVENTION

Problems to be Solved by the Invention

In the system disclosed in Patent Document 4, when two layers of the drive coil and the detection coil are formed into a sheet-like shape, there arises no problem in the case where the pressure distribution detector is placed on a flat surface. However, in the case where the pressure distribution detector is placed on a curved surface or irregular surface, it is difficult to align the axes of coils which are a pair of electromagnetic coupling. That is, even if the axes of the coils are aligned to each other in its manufacturing process, when the device is placed not on the flat surface but on the curved surface, large misalignment is caused between the layer of the drive coil and that of the detection coil, adversely affecting the detection sensitivity or detection accuracy of the pressure distribution.

The present invention has been made in view of the above situation, and an object thereof is to provide a pressure distribution detector less influenced by its installation environment, that is, a pressure distribution detector that detection sensitivity or detection accuracy is less adversely affected even if the device is fitted not only to a flat surface but also a surface having an arbitrary shape such as a curved surface.

Means for Solving the Problems

In order to achieve the above object, according to the present invention, there is provided a pressure distribution detector utilizing electromagnetic coupling comprising: a plurality of drive wires each arranged in a looped pattern on a substrate; a plurality of detection wires each arranged in a looped pattern so as to be electromagnetically coupled to each of the plurality of drive wires; a plurality of electromagnetic coupling portions configured to allow the drive wires and the detection wires to be electromagnetically coupled to each other; a spacer keeping a constant distance between the plurality of drive wires and the plurality of detection wires; a variable electromagnetic coupling changing a degree of electromagnetic coupling at each of the plurality of electromagnetic coupling portions, which is movably provided adjacent to the plurality of electromagnetic coupling portions; a drive section connected to the plurality of drive wires so as to drive the plurality of drive wires; and a detection section connected to the plurality of detection wires so as to detect a change in the degree of electromagnetic coupling at each of the electromagnetic coupling portions from the plurality of detection wires.

The drive wires and the detection wires may each be formed into a linear shape and are arranged perpendicular to each other, and the plurality of electromagnetic coupling portions may be provided by forming a plurality of conductive plates that distances from the drive wires and the detection wires are kept constant at portions adjacent to which the drive wires and the detection wires are arranged perpendicular to each other.

The drive wires and the detection wires may each be formed into a linear shape and are arranged perpendicular to each other, and the plurality of electromagnetic coupling portions may be provided by forming a plurality of conductive plates that distances from the drive wires and the detection wires are kept constant at portions adjacent to between the driving wires and adjacent to between the detection wires.

The drive wires and the detection wires may each be formed into a linear shape and are arranged perpendicular to each other, and the plurality of electromagnetic coupling portions may be provided by forming a plurality of conductive plates that distances from the drive wires and the detection wires are kept constant at portions adjacent to the detection wires and adjacent to between the drive wires and portions adjacent to the drive wires and adjacent to between the detection wires.

The plurality of electromagnetic coupling portions may comprise a plurality of drive coils each obtained by forming the drive wire into a coil-like shape and a plurality of detection coils each obtained by forming the detection wire into a coil-like shape, which are configured to be electromagnetically coupled to the plurality of drive coils in pairs, respectively.

The plurality of electromagnetic coupling portions may comprise the drive wires each formed into a linear shape and a plurality of detection coils each obtained by forming the detection wire into a coil-like shape.

The plurality of electromagnetic coupling portions may comprise a plurality of drive coils each obtained by forming the drive wire into a coil-like shape and the detection wires each formed into a linear shape.

The size of the plurality of drive coils may be different from that of the plurality of detection coils.

The plurality of drive coils may serially be connected in a predetermined direction, and the plurality of detection coils may serially be connected in the direction perpendicular to the predetermined direction.

The plurality of drive coils and the plurality of detection coils may constitute convex portions, portions at which the respective coils are serially connected constitute concave portions, and the convex portions and the concave portions may alternately be arranged at portions between adjacent serially-connected rows of the drive coils and/or at portions between adjacent serially-connected rows of the detection coils.

The plurality of drive coils and/or the plurality of detection coils may be formed into substantially a square shape and serially connected to adjacent coils at their corner portions.

The spacer may be made of a substrate, and the plurality of drive wires may be provided on one surface of the substrate and the plurality of detection wires are provided on the other surface thereof.

The spacer may be made of the substrate, and the plurality of drive coils and the plurality of detection coils may be provided on the same surface of the substrate.

The spacer may have cut portions formed at portions except for portions at which the electromagnetic coupling portions are provided.

The spacer has flexibility.

The variable electromagnetic coupling may be provided adjacent to the electromagnetic coupling portions via a first cushion material.

The variable electromagnetic coupling may have flexibility.

The pressure distribution detector may further comprise an electromagnetic shield formed to the side of the electromagnetic coupling portions opposite to the side at which the variable electromagnetic coupling is provided.

The electromagnetic shield may be provided adjacent to the electromagnetic coupling portions via a second cushion material.

The first cushion material or second cushion material may be made of polypropylene and/or polyethylene.

A plurality of the pressure distribution detectors may be combined so as to detect pressure distribution.

The pressure distribution detector may further comprise: a plurality of reference coils electromagnetically coupled to the plurality of drive coils in pairs, respectively; and a keeping section keeping the distance between the plurality of reference coils and the plurality of drive coils and/or distance between the plurality of reference coils and the plurality of detection coils constant, the detection section comprising a differential amplifier for detecting a difference between the plurality of detection coils and the corresponding reference coils, respectively.

ADVANTAGES OF THE INVENTION

The pressure distribution detector according to the present invention has the following advantages: the size of the detection surface thereof can be larger; high tolerance for noise; and capable of detecting pressure distribution without being influenced by the shape of a surface to be detected and installation condition. Further, the pressure distribution detector according to the present invention can be fitted to a surface of arbitrary shape, so that the detector has a wide range of application.

EXPLANATION OF REFERENCE NUMERALS

Figure 1:
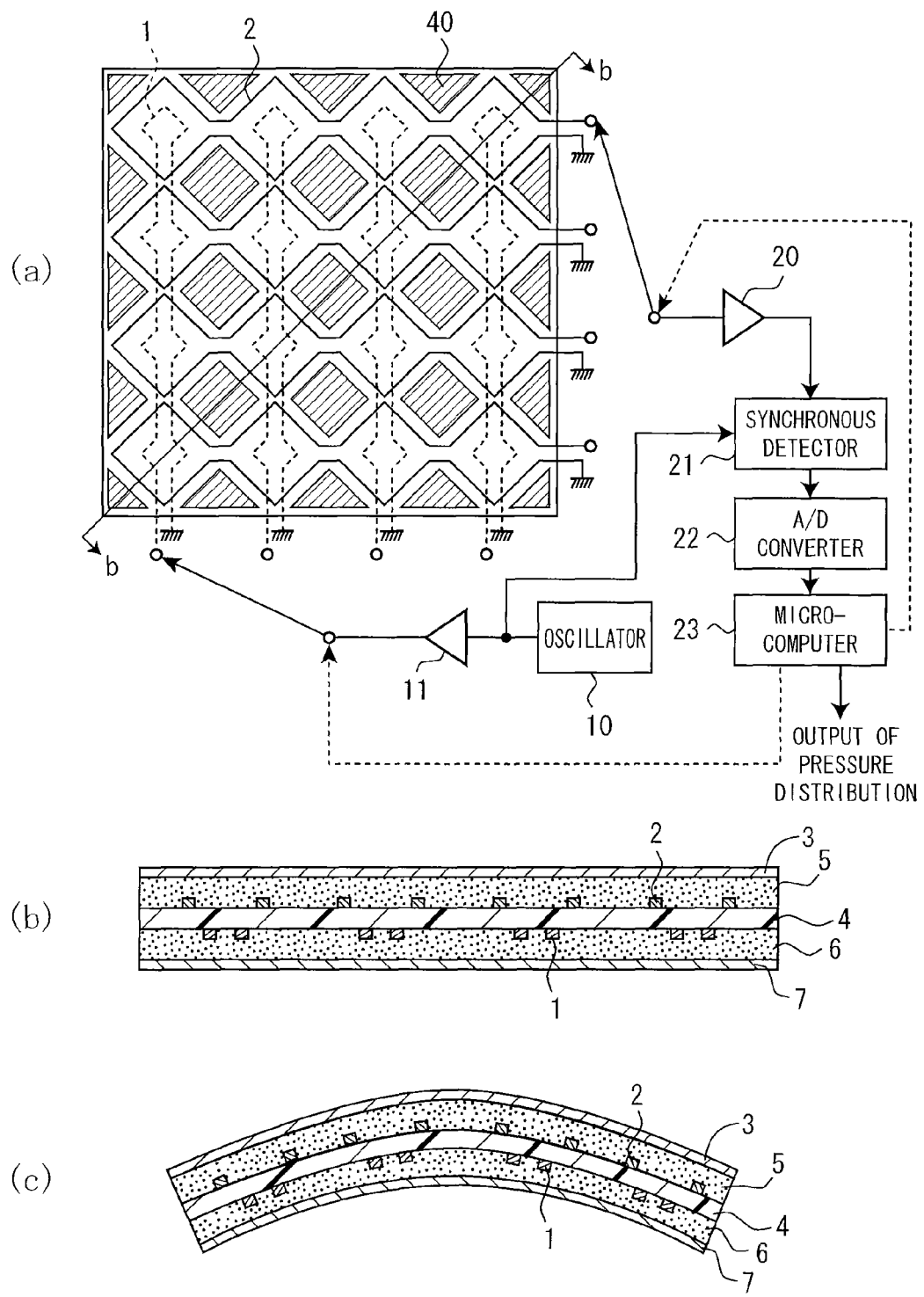
FIGS. 1(a) to 1(c) are schematic views for explaining a pressure distribution detector according to a first embodiment of the present invention.

1: Drive coil
2: Detection coil
3: Variable electromagnetic coupling member
4: Spacer
5: Cushion material
6: Cushion material
7: Electromagnetic shield member
10: Oscillator
11: Driver circuit
20: Amplifier 21: Synchronous detector
22: A/D converter
23: Microcomputer
25: Differential amplifier
41: Reference coil
42: Spacer
43: Spacer
50: Conductive plate
55: Insulating layer
100: Drive wire
200: Detection wire

BEST MODE FOR CARRYING OUT THE INVENTION

Now, preferred embodiments according to the present invention is explained with reference to the accompanying drawings. FIGS. 1(a) to 1(c) are views for explaining a pressure distribution detector according to a first embodiment of the present invention. FIG. 1(a) is a partly transparent schematic plan view of the pressure distribution detector, FIG. 1(b) is a cross-sectional view thereof taken along b-b line, and FIG. 1(c) is a cross-sectional view thereof in a curved state. As shown in FIGS. 1(a) and 1(b), the pressure distribution detector of the present invention is mainly constituted by a plurality of drive coils 1, a plurality of detection coils 2, a variable electromagnetic coupling member 3 provided adjacent to the coils, a drive circuit connected to the drive coils 1, and a detection circuit connected to the detection coils 2.

The plurality of drive coils 1 are serially connected to constitute a plurality of drive coil rows which are arranged in parallel to each other. The plurality of detection coils 2 are serially connected to constitute a plurality of detection coil rows which are arranged in parallel to each other in the direction perpendicular to the arrangement direction of the detection coil rows. The detection coils 2 thus arranged are electromagnetically coupled to the plurality of drive coils 1 in pairs, respectively. Although the drive coils and/or detection coils have a substantially-square loop shape in the drawing, the present invention is not limited thereto and they may have any shape such as circular loop shape, spiral shape, or meander shape as long as a coil can be formed. In addition, a rectangular shaped coil may be used. In the case where substantially square loop shape coils are used, when the adjacent coils are serially connected at their corner portions, the adjacent sides of the coils are arranged perpendicular to each other, resulting in a reduction of interference between adjacent coils.

Both of the drive coils and the detection coils need not necessarily be formed into a coil shape. Electromagnetic coupling can be achieved even with a combination of linearly formed drive wires and the detection coils having a coil shape. Also in the reverse case, i.e., with a combination of drive coils having a coil shape and linearly formed detection wires, electromagnetic coupling can be achieved.

Further, although the size of the drive coil 1 is smaller than that of the detection coil 2 in the drawing, the present invention is not limited thereto and the size of both coils may be identical to each other. Conversely, the size of the drive coil may be larger than that of the detection coil.

The drive coils 1 and the detection coils 2 are arranged on a substrate. In the illustrated example, the substrate functions as a spacer 4 for keeping a constant distance between the drive coil 1 and the detection coil 2. The substrate need not necessarily be used as the spacer, and an alternative spacer may additionally be provided to keep a constant distance. The substrate serving as the spacer 4 is made of an insulating material. More specifically, the substrate is a flexible member made of a flexible substrate or PET material. However, in the case where it is not necessary to form a flexible pressure distribution detection surface, the substrate may be a nonflexible member such as a glass-epoxy substrate. In the case where the drive coils 1 and the detection coils 2 are arranged respectively on the front and rear surfaces with the spacer 4 interposed therebetween as shown in the figure, the drive coils 1 and the detection coils 2 may be bonded to a double-side substrate or patterned by a vapor-deposition or an etching process. Further, in order to allow the detection surface to be easily fitted to a surface of arbitrary shape, cut portions 40 may be formed by cutting the spacer 4 except for portions at which the drive coils and the detection coils are arranged, whereby a more flexible detection surface is obtained.

In order to vary the degree of electromagnetic coupling between the drive coil 1 and the detection coil 2, the variable electromagnetic coupling member 3 is movably provided adjacent to the drive coil 1 and the detection coil 2 between which a constant distance is kept. The variable electromagnetic coupling member 3 is a conductor having a sheet-like shape. As a conductor material, one having flexibility, such as a conductive cloth made of acrylic fiber or the like plated by nickel or conductive rubber is preferably used. As the variable electromagnetic coupling member 3 having flexibility, aluminum foil or the like may be used, or one obtained by vapor-depositing a conductor on a cushion material 5 to be described later may be used. However, the present invention is not limited thereto, and in the case where it is not necessary to form a flexible pressure distribution detection surface, a non-flexible conductor may be used. In the case where the variable electromagnetic coupling member has a sheet-like shape, it is sufficient to simply form a conductor over the entire surface, facilitating the manufacturing process.

The variable electromagnetic coupling member 3 need not necessarily be a conductor but may be, e.g., a magnetic body as long as it can vary the degree of electromagnetic coupling between the drive coils 1 and the detection coils 2. That is, a magnetic sheet formed of a soft magnetic body, specifically, amorphous magnetic body or permalloy may be provided adjacent to the drive coils 1 and the detection coils 2.

The variable electromagnetic coupling member 3 may be provided on the drive coils 1 and the detection coils 2 via the cushion material 5. The cushion material 5 may be a silicone sponge which is a foam body of silicone or one made of polypropylene and/or polyethylene. Various cushion materials may be used as the cushion material 5 as long as it is easily formed into a sheet-like shape and it has elasticity and durability. Further, by changing the hardness of the cushion material 5, a pressure distribution detector capable of meeting every pressure range can be manufactured.

When the drive coil is high-frequency driven and where the variable electromagnetic coupling member made of a conductor is brought close to the electromagnetically coupled two coils, the degree of electromagnetic coupling between the two coils is reduced with the result that an induced current or induced voltage measured in the detection coil 2 is reduced. On the other hand, when the variable electromagnetic coupling member made of a magnetic body is brought close to the electromagnetically coupled two coils, the degree of electromagnetic coupling between the two coils is increased with the result that an induced current or induced voltage measured in the detection coil 2 is increased. Based on the above phenomenon, the pressure distribution detector according to the present invention detects the pressure distribution by detecting between which pair of electromagnetically coupled coils a change appears.

A drive circuit is connected to the drive coils 1 so as to drive them. In the illustrated example, the drive circuit is constituted by an oscillator 10 and a driver circuit 11 and uses a switch circuit or the like to sequentially drive the respective drive coil rows. The drive circuit may drive all the drive coil rows at a time by changing the drive frequency for respective drive coil rows.

A detection circuit is connected to the detection coils 2 so as to detect the degree of electromagnetic coupling between the drive coils 1 and the detection coils 2. In the illustrated example, the detection circuit is constituted by an amplifier 20, a synchronous detector 21, and an A/D converter 22 and uses a switch circuit or the like to sequentially detect an induced current or induced voltage in the respective coil detection rows. The synchronous detector 21 receives an output of the oscillator 10, multiplies outputs of the oscillator and outputs of the detection coils 2 together, and time integrates the production result. The induced current or induced voltage in all the detection coil rows may be detected at a time by individually providing the detection circuits for respective detection coil TOWS.

The above drive circuit and the detection circuit are controlled by a microcomputer 23 such as a DSP or the like so that a required pressure distribution output can be obtained.

In the illustrated example, the rows of the drive coils 1 and the rows of the detection coils 2 are arranged perpendicular to each other to arrange the electromagnetically coupled pairs in a matrix form, and the respective drive coil rows are driven so as to detect the induced current or induced voltage in the respective detection rows, whereby it is detected between which pair of coils a change in the induced current or induced voltage appears. However, the present invention is not limited to this configuration, and a configuration may be adopted in which a drive circuit and a detection circuit are provided for each coil pair and induced current or induced voltage is individually detected from each coil pair.

If required, an electromagnetic shield member 7 may be provided via a cushion material 6 on the side opposite to the side at which the variable electromagnetic coupling member 3 is provided. The electromagnetic shield member 7 may be made of, e.g., a conductor or magnetic body. By providing the electromagnetic shield member 7, the pressure distribution detector has a high tolerance for external noise and less influenced by the installation environment. As in the case of the cushion material 5, the cushion material 6 may be a silicone sponge which is a foam body of silicone or one made of polypropylene and/or polyethylene.

When the electromagnetic shield member 7 is configured in the same manner as the variable electromagnetic coupling member 3, a two-sided symmetric detection surface can be obtained. In this case, the cushion material 6 may be configured as in the same manner as the cushion member 5. With this configuration, a two-sided symmetric pressure distribution detector can be obtained. In the case where the pressure distribution detector according to the present invention is applied to a man-machine interface, by drawing different figures on the outside surfaces of the variable electromagnetic coupling member 3 and the electromagnetic shield member 7, both the front and rear surfaces can be used depending on the purpose. The variable width of the degree of electromagnetic coupling becomes larger in the case where the detection coils are arranged near the variable electromagnetic coupling member. Thus, when the pressure distribution detector is used upside down, connection of the drive circuit and the detection circuit may be reversed, if necessary.

Figure 2:
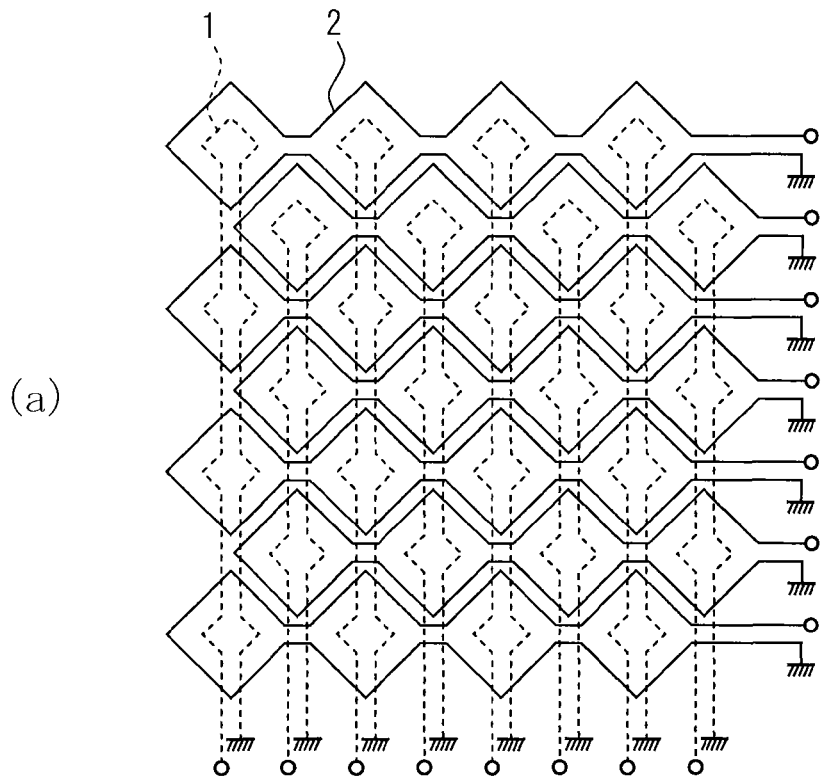
FIGS. 2(a) and 2(b) are schematic views for explaining another example of a coil pattern of the pressure distribution detector according to the present invention.
Figure 2:
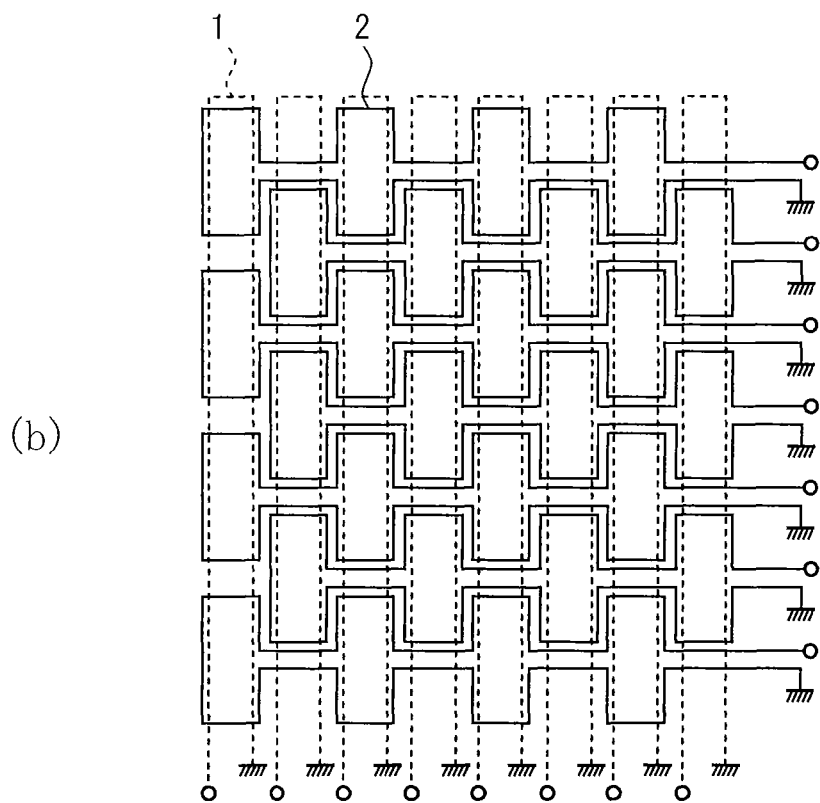

In the coil pattern shown in FIG. 1(*a*), electromagnetic coupling portions are vertically and horizontally arranged in a matrix form. In the following, another coil pattern will be described using FIGS. 2(*a*) and 2(*b*). In this pattern, in order to form a higher resolution detection surface, the electromagnetic coupled portions are made denser. FIGS. 2(*a*) and 2(*b*) are top view for explaining another coil pattern of the first embodiment of the pressure distribution detector according to the present invention. FIG. 2(*a*) shows a coil pattern achieved using coils each having substantially a square shape, and FIG. 2(*b*) shows a coil pattern achieved using coils each having a rectangular shape. As shown in FIG. 2(*a*), in the serially-connected coils, the portions corresponding to substantially a square shaped drive coils 1 and detection coils 2 constitute convex portions, and portions at which respective coils are serially connected constitute concave portions. The convex portions and the concave portions are alternately arranged at portions between adjacent serially-connected rows of the drive coils 1. More specifically, the convex portions are fitted in the concave portions. Further, convex portions and concave portions are alternately arranged at portions between adjacent serially-connected rows of the detection coils 2. In addition, since the detection coil 2 is constituted by a coil having a size smaller than that of the drive coil 1, the adjacent rows of the detection coils 2 are not so close as to allow the convex portions to be fitted in the concave portions. By forming the coil pattern in this manner, it is possible to increase the number of electromagnetic coupling portions without reducing the size of the coils, thereby increasing resolution.

Further, also in the case where each coil is formed into a rectangular shape as shown in FIG. 2(*b*), the portions corresponding to drive coils 1 constitute convex portions, and portions at which respective coils are serially connected constitute concave portions. The convex portions and the concave portions are alternately arranged at portions between adjacent serially-connected rows of the coils. Also, in this case, it is possible to realize a pressure distribution detector having high resolution. Although the drive wire is formed into a linear shape and the detection wire is formed into a rectangular coil-like shape in the illustrated example, the present invention is not limited to this configuration but also the drive wire may be formed into a coil-like shape. Further, conversely, a configuration may be adopted in which the drive wire is formed into a coil-like shape and the detection wire is formed into a linear shape.

The pressure distribution detector according to the present invention can be formed to have a flexible structure as a whole, so that when the detector is provided in the seat of a vehicle for air-bag control, it can satisfactorily fitted to the seat. In the case where the pressure distribution detector according to the first embodiment of the present invention having the configuration described above is set on a curved surface, the cross-section thereof is as shown in FIG. 1(*c*). Even when the detector is greatly bent, the distance between the drive coils 1 and the detection coil 2 is kept constant by the spacer 4, so that a large change does not occur in the detection sensitivity and the detection accuracy of the pressure distribution. As described above, in the pressure distribution detector according to the present invention, detection of a change in the degree of electromagnetic coupling is made not based on a change in the distance between the drive coil 1 and the detection coil 2, so that measurement can stably be carried out irrespective of the shape of a surface to be detected.

Figure 3:
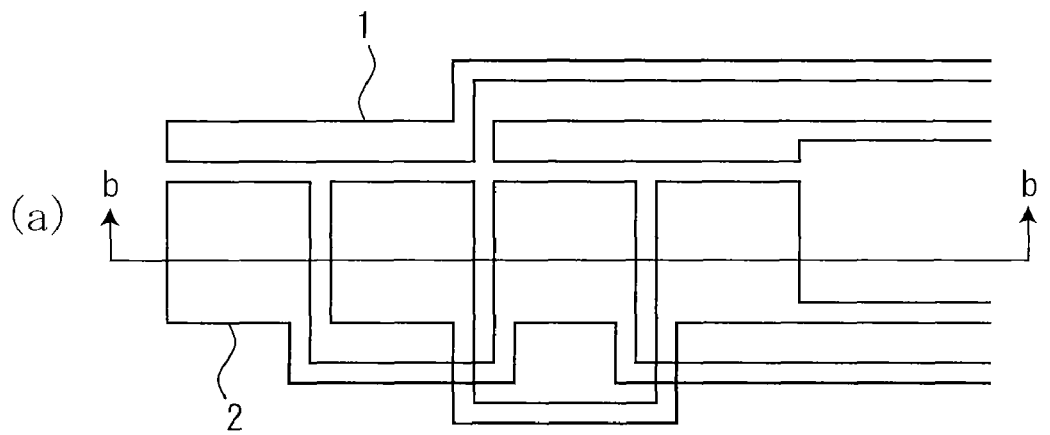
FIGS. 3(a) and 3(b) are schematic views for explaining a pressure distribution detector according to a second embodiment of the present invention.
Figure 3:
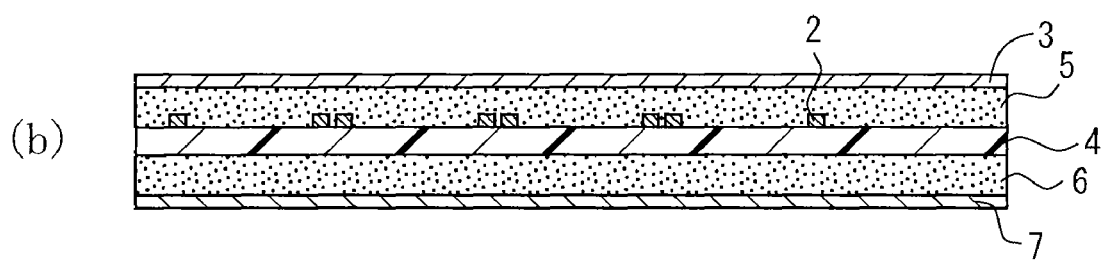

Next, a pressure distribution detector according to a second embodiment of the present invention will be described using FIGS. 3(*a*) and 3(*b*). FIGS. 3(*a*) and 3(*b*) are views for explaining a pressure distribution detector according to a second embodiment of the present invention. FIG. 3(*a*) is a schematic plan view for explaining the pattern of a coil portion, and FIG. 3(b) is a cross-sectional view taken along b-b line. In FIGS. 3(a) and 3(b), the same reference numerals as those in FIGS. 1(a) to 1(c) depict the same parts as those in FIGS. 1(a) to 1(c), and the descriptions thereof will be omitted here. In the first embodiment, the drive coils 1 and the detection coils 2 are arranged respectively on the front and rear surfaces of the substrate serving as the spacer 4; while in the second embodiment, the drive coils 1 and the detection coils 2 are arranged on the same surface of the substrate. In this case, coils are formed into a rectangular shape and arranged such that one side of the drive coil 1 and one side of the detection coil 2 are parallel to each other. Further, the coils are arranged at predetermined intervals so that the distance between the drive coil 1 and the detection coil 2 is kept constant. That is, in the first embodiment, the spacer function is realized by utilizing the thickness direction of the substrate; while in the second embodiment, the spacer function is realized by arranging the coils at predetermined intervals in the plate surface direction.

In the illustrated example, the rectangular drive coils 1 are arranged along predetermined directions and substantially square-shaped detection coils 2 are arranged adjacent to the respective drive coils 1. The detection coils 2 are alternately arranged such that one detection coil row is composed of a plurality of detection coils 2 disposed between coils of another detection coil row. Further, the drive coil 1 is so disposed adjacent to the detection coils 2 as to extend over a plurality of detection coil rows so that the drive coil 1 is electromagnetically coupled to one detection coil 2 of each detection coil row. With this configuration, it is possible to detect at which portion of the pressure distribution detection surface a change in the degree of electromagnetic coupling occurs.

The drive coils 1 and the detection coils 2 may be bonded to the same surface of the substrate serving as the spacer 4 or patterned by a vapor-deposition or etching process. Further, in order to allow the detection surface to be easily fitted to a surface of arbitrary shape, cut portions may be formed by cutting the spacer 4 except for portions at which the drive coils and the detection coils are arranged, whereby a more flexible detection surface is obtained.

The coil pattern is not limited to the example shown in FIGS. 3(a) and 3(b) in the configuration in which the drive coils 1 and the detection coils 2 are arranged on the same surface of the substrate. For example, substantially a square shaped coil serially connected to adjacent coils at its corner portions, which is shown in FIGS. 1(a) to 1(c), may be used. That is, enamel wires covered by an insulating film may be used to constitute the coil rows such that the drive coil row and the detection coil row are arranged perpendicular to each other on the same surface of the substrate. Also, portions of respective coils at which the drive coil row and the detection coil row overlap each other on the same surface of the substrate may be connected on the rear surface using through holes.

The example of FIGS. 3(a) and 3(b) shows a two-sided symmetric structure. However, as in the case of the first embodiment, the present invention is not limited to this configuration. For example, the electromagnetic shield member 7 may be fixed using a hard material instead of the cushion material 6, or the cushion material 6 or the electromagnetic shield member 7 need not necessarily be provided. Further, the pattern formed by the drive coils and the detection coils is also not limited to the illustrated example but any pattern may be used as long as the drive coil and the detection coil constitute a pair of electromagnetic coupling. What is important in the pressure distribution detector according to the present invention is keep the distance between the drive coil and the detection coil constant.

Figure 4:
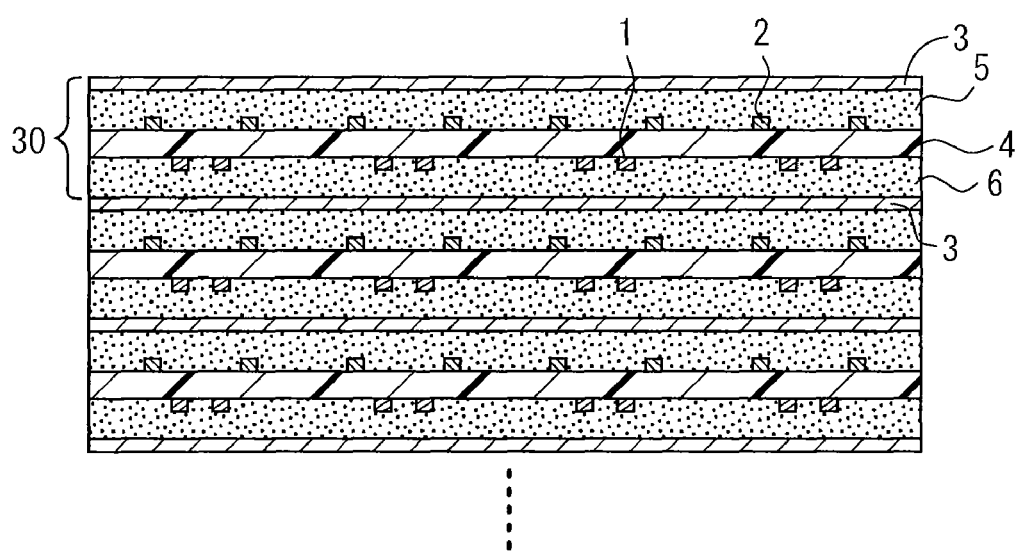
FIG. 4 is a schematic view for explaining a pressure distribution detector according to a third embodiment of the present invention.

An example in which a plurality of the pressure distribution detectors according to the first or second embodiment are combined will be described below. FIG. 4 is a view for explaining a pressure distribution detector according to a third embodiment of the present invention. In FIG. 4, the same reference numerals as those in FIGS. 1(a) to 1(c) depict the same parts as those in FIGS. 1(a) to 1(c). In the third embodiment, one pressure distribution detector is constituted by stacking a plurality of units 30 each functioning as the pressure distribution detector according to the first or second embodiment. In this configuration, by setting the hardness of the cushion material 5 and/or cushion material 6 of each unit 30 at a desired level, it is possible to achieve accurate pressure distribution detection in a wide range from a change in the electromagnetic coupling due to imperceptible pressure to the change due to large pressure.

In the illustrated example, the pressure distribution detector of the first embodiment is used as the unit 30, and the variable electromagnetic coupling member 3 provided on the upper layer of the lower unit is used as a substitute for the electromagnetic shield member. However, the present invention is not limited to the configuration shown in the illustrated example, but the electromagnetic shield member may be provided, or the cushion member 6 need not necessarily be provided. Further, not the pressure distribution detectors of the first embodiment but the pressure distribution detectors of the second embodiment may be stacked to constitute the pressure distribution detector according to the third embodiment.

Figure 5:
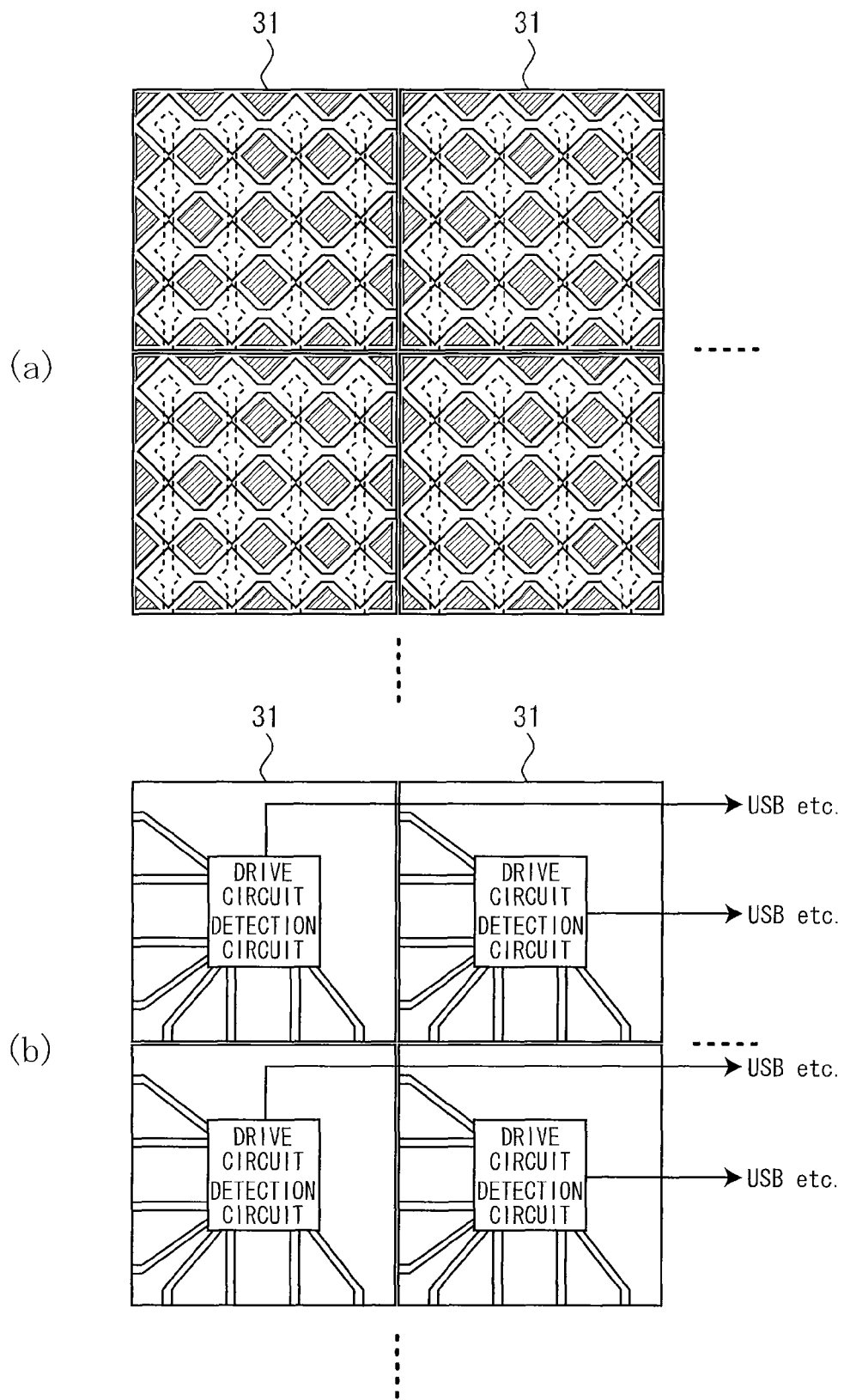
FIGS. 5(a) and 5(b) are schematic views for explaining a pressure distribution detector according to a fourth embodiment of the present invention.

Next, a pressure distribution detector according to a fourth embodiment will be described. FIGS. 5(a) and 5(b) are views for explaining a pressure distribution detector according to a fourth embodiment of the present invention. FIG. 5(a) is a partly transparent schematic plan view, and FIG. 5(b) is a schematic rear surface view. The pressure distribution detector of the forth embodiment of the present invention is obtained by arranging a plurality of units 31 each functioning as the pressure distribution detector 1 according to the first or second embodiment. The present embodiment can suitably be applied to a case where pressure distribution needs to be detected over a large area, such as a case of detecting how people move about in an art museum or store, analyzing motion of athletes, or inspecting road-hugging property. In this case, the drive circuit and the detection circuit are provided for each unit 31 so as to allow the pressure distribution to be detected for each unit 31. Then, outputs from these units 31 are input to a computer via an interface such as a USB, whereby the pressure distribution over a large area can be detected. In order to prevent influence of the drive circuit or detection circuit on electromagnetic coupling, the drive circuit and the detection circuit are preferably provided outside (under) the electromagnetic shield member 7.

In general, in the case where the large area pressure distribution is detected, the number of cells corresponding to pressure measurement points is increased, requiring longer time for measurement. Therefore, in this case, an expensive apparatus such as a high-performance computer needs to be prepared. However, the pressure distribution detector of the fourth embodiment can perform measurement processing on a unit-by-unit basis, enabling high-speed measurement. In order to prevent interference between adjacent units, the drive frequency or drive waveform can be changed for each unit.

Also in the above third embodiment, the same effect as above can be obtained by providing the drive circuit and the detection circuit for each unit.

Further, in the case where the pressure distribution detector configured as the fourth embodiment is transport to an installation location, the device can be divided in units for transportation. Further, in the case where flexibility is provided with each unit, it can be transported in a rolled state.

Figure 6:
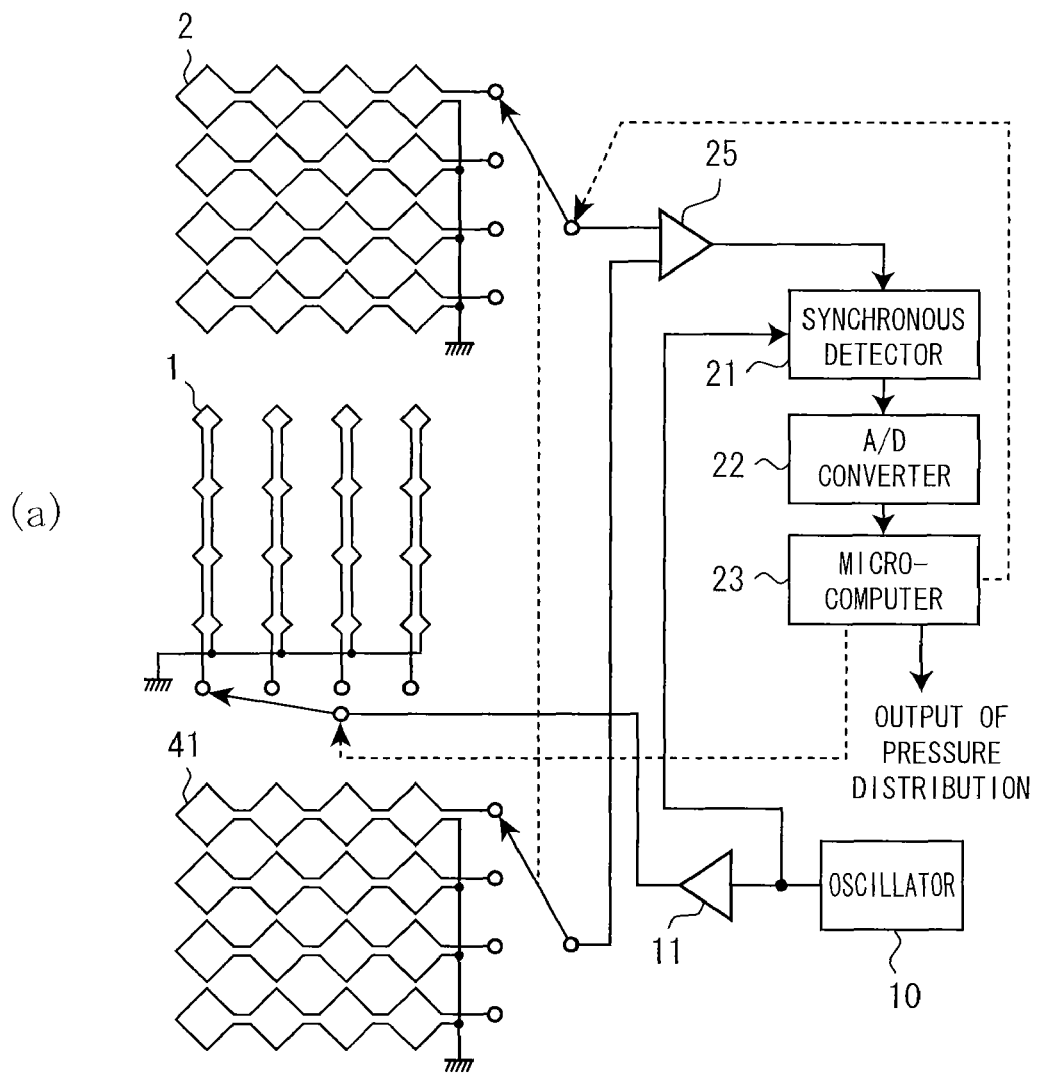
FIGS. 6(a) and 6(b) are schematic views for explaining a pressure distribution detector according to a fifth embodiment of the present invention.
Figure 6:
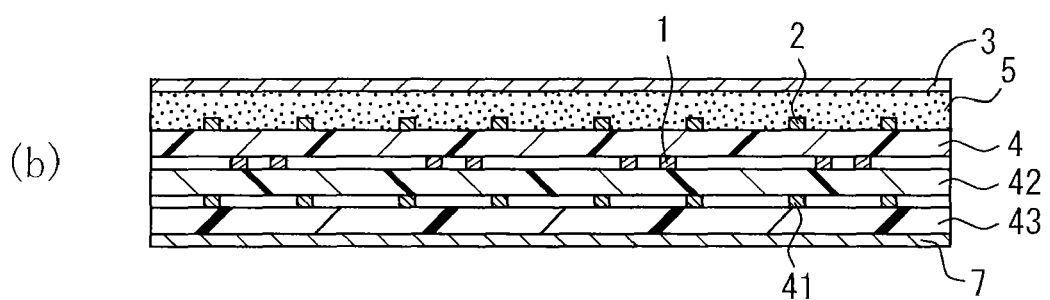

Next, a pressure distribution detector according to a fifth embodiment of the present invention will be described. In the present embodiment, a reference coil is provided in addition to the drive coil and the detection coil so as to increase mainly signal-to-noise ratio. FIGS. 6(a) and 6(b) are views for explaining a pressure distribution detector according to a fifth embodiment of the present invention. FIG. 6(a) is a schematic explanatory view showing respective layers in a divided manner for easy understanding of the connection configuration of coils of each layer, and FIG. 6(b) is a cross-sectional view thereof. In FIGS. 6(a) and 6(b), the same reference numerals as those in FIGS. 1(a) to 1(c) depict the same parts as those in FIGS. 1(a) to 1(c). As shown in FIGS. 6(a) and 6(b), in the fifth embodiment, a reference coil 41 electromagnetically coupled to the drive coil 1 is provided in addition to the drive coil 1 and the detection coil 2. Each of the above coils is provided on a multilayer substrate made of, e.g., a flexible substrate, PET material, or glass epoxy. Not only the distance between the drive coil 1 and the detection coil 2 but also the distances between the reference coil 41 and the drive coil 1 and/or between the reference coil 41 and the detection coil 2 are kept constant by a spacer 42. The reference coil 41 is wound in the same direction as the detection coil 2, and a plurality of the reference coils 41 are serially connected to constitute a plurality of reference coil rows.

The pressure distribution detector of the fifth embodiment detects a difference between the detection coil 2 and the reference coil 41, so that in the case where the electromagnetic shield member 7 is provided in the fifth embodiment, a spacer 43 for keeping the distance between the reference coil 41 and the electromagnetic shield member 7 may be provided so as to prevent the difference signal between them from being reduced due to a change in the degree of electromagnetic coupling in the reference coil 41. Like the spacer 4, the spacer 42 or spacer 43 may be an insulating flexible member made of a flexible substrate or PET material or insulating glass epoxy substrate.

In order to detect a difference between outputs from the detection coil 2 and the reference coil 41, a differential amplifier 25 is connected thereto. The detection coil 2 and the reference coil 41 are connected to the differential amplifier 25 by means of an interlock switch so that vertically corresponding coil rows can be connected to the differential amplifier 25. A voltage/current induced by the reference coil 41 is less influenced by a change in the variable electromagnetic coupling member 3.

As described above, in the fifth embodiment, the detection coil 2 and the reference coil 41 have substantially the same configuration, so that even if surrounding noise is superimposed on the induced voltage or induced current of the coil, it is superimposed on the detection coil 2 and the reference coil 41 in the same manner as each other. As a result, the surrounding noise to the detection coil 2 and the reference coil 41 are canceled in the differential amplifier 25. Accordingly, signal-to-noise ratio can be improved to enable high-sensitive measurement.

Although the drive coil and the detection coil is directly electromagnetically coupled to each other in the above embodiments, the pressure distribution detector according to the present invention is not limited to this configuration but may have a configuration in which the drive coil and the detection coil is electromagnetically coupled to each other in an indirect manner. In the following, a pressure distribution detector using an indirect electromagnetic coupling will be described.

Figure 7:
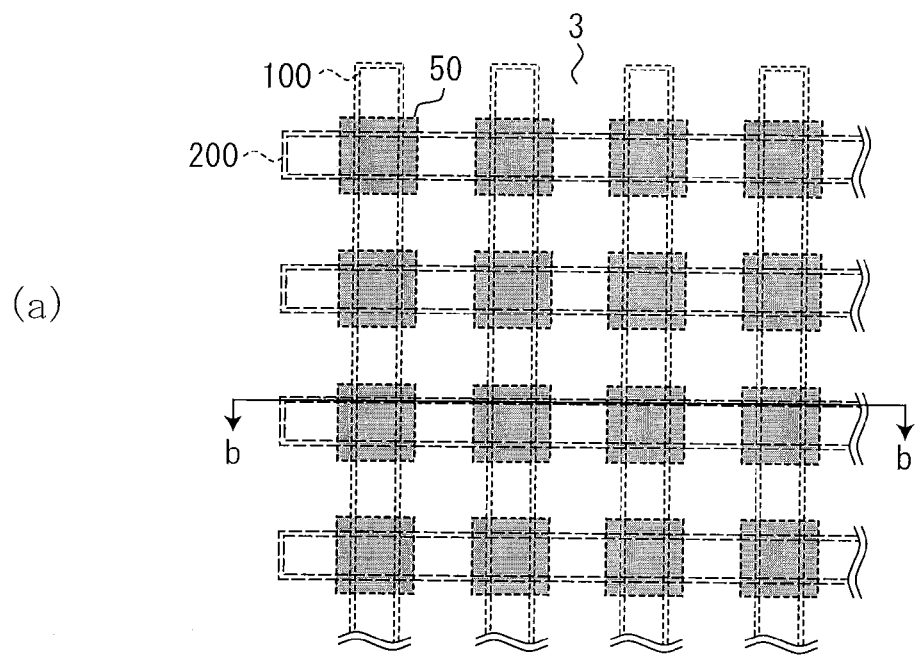
FIGS. 7(a) and 7(b) are schematic views for explaining an example in which electromagnetic coupling portions achieving indirect coupling are formed in the pressure distribution detector according to the present invention.
Figure 7:
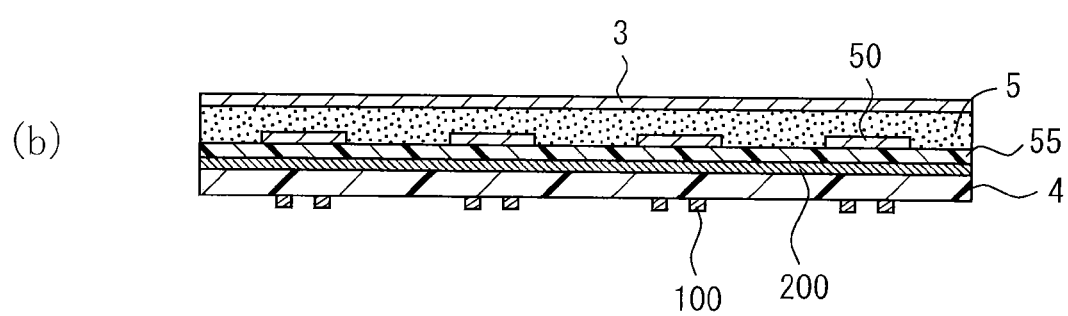

FIGS. 7(a) and 7(b) show an example of the pressure distribution detector according to the present invention in which linear drive and detection wires are formed into a loop shape respectively and conductor plates are provided adjacent thereto so that the drive and detection wires are electromagnetically coupled to each other. FIG. 7(a) is a partly top view of the detection surface, and FIG. 7(b) is a cross-sectional view taken along b-b line. As illustrated, drive wires 100 and detection wires 200 are formed into a linear manner respectively on the front and rear surfaces of the spacer 4 which is a two-sided substrate, and conductive plates 50 are so formed adjacent to portions at which the drive wires 100 and the detection wires 200 cross each other at right angles as to keep the distance between the drive wires 100 and the detection wires 200 constant, whereby electromagnetic coupling portions are provided. The drive wire 100 and the detection wire 200 arranged perpendicular to each other are not electromagnetically coupled by themselves. However, when the conductive plate 50 is provided adjacent to the orthogonal cross point, indirect electromagnetic coupling between the drive wire 100 and the detection wire 200 is achieved by eddy current caused in the conductive plate 50. The conductive plates 50 are formed on the detection wires 200 formed on the spacer 4 via a predetermined insulating layer 55. However, the present invention is not limited to this configuration, but a configuration may be adopted in which the detection wires 200 are buried in the spacer 4 and the conductive plates 50 are patterned on the surface of the spacer 4 as long as the distance between the drive wire and the detection wire is kept constant. In the pressure distribution detector according to the present invention, the variable electromagnetic coupling member 3 is movably provided adjacent to the electromagnetic coupling portions thus formed via the cushion material 5 so as to change the degree of electromagnetic coupling between each pair of drive and detection wires.

Although, in the illustrated example, the conductive plates 50 are disposed above the portions at which the drive wires 100 and the detection wires 200 cross each other at right angles, the present invention is not limited to this configuration, but the conductive plates 50 may be disposed under the orthogonal cross points as long as the electromagnetic coupling between the drive and detection wires is achieved. Further, although each conductive plates 50 is so disposed as to cover the portion at which the drive wires 100 and the detection wires 200 cross each other at right angles, it may be so disposed inside the square constituted by the orthogonally crossed wires as to eliminate overlap with the wires when viewed from the above. In this case, the conductive plates 50 need not necessarily be disposed above the drive and detection wires, but may be disposed in the same plane as the drive wires or the detection wires.

Although the conductive plate 50 is formed into a flat plate in the illustrated example, the present invention is not limited thereto and an opening may be formed at the center portion of the conductive plate.

Figure 8:
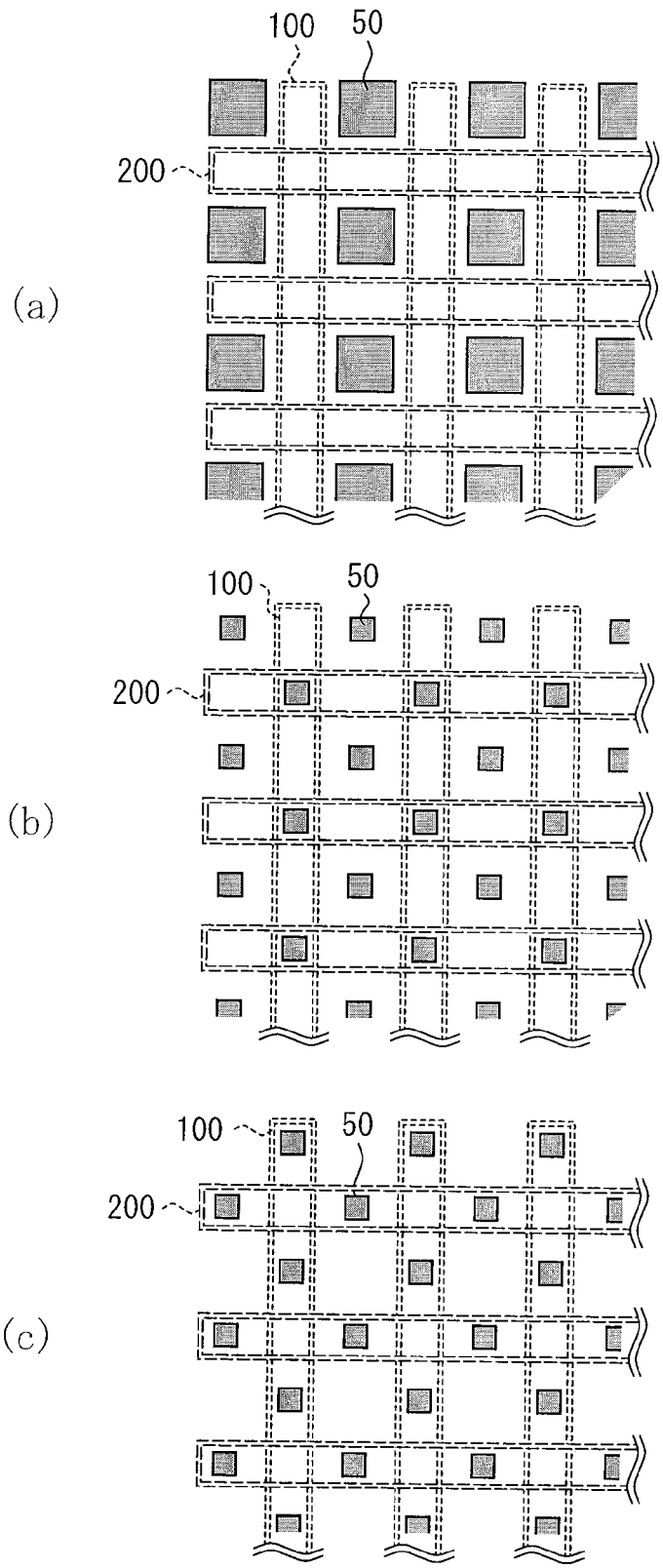
FIGS. 8(a) to 8(c) are schematic views for explaining variations of the arrangement example of conductive plates at which indirect electromagnetic coupling is achieved in the pressure distribution detector according to the present invention.

Although, in the above example, the conductive plates 50 are disposed adjacent to the portions at which the drive wires 100 and the detection wires 200 cross each other at right angles, the conductive plates 50 may be arranged in the following patterns. FIGS. 8(a) to 8(c) are views for explaining variations of the arrangement example of the conductive plates in the pressure distribution detector according to the present invention. Since these illustrations aim to explain the variations of the arrangement example of the conductive plates, the cushion materials or the variable electromagnetic coupling member are omitted in these illustrations. FIG. 8(a) shows an example in which the conductive plates 50 are formed at portions adjacent to between the drive wires 100 and at portions adjacent to between the detection wires 200. FIG. 8(b) shows an example in which the conductive plates 50 are formed at portions adjacent to the orthogonal cross points of the drive wires 100 and the detection wires 200 and at portions adjacent to between the drive wires 100 and adjacent to between the detection wires 200. FIG. 8(c) shows an example in which the conductive plates 50 are formed at portions adjacent to the drive wires 100 and adjacent to between the detection wires 200 and at portions adjacent to the detection wires 200 and adjacent to between adjacent drive wires 100. The electromagnetic coupling portions can also be formed in the case where the conductive plates are arranged in such patterns. Although, in the examples of FIGS. 8(a) to 8(c), the conductive plates 50 are so disposed inside the square constituted by the orthogonally crossed wires as to eliminate overlap with the wires when viewed from the above, the conductive plates 50 may be so disposed as to overlap with the wires when viewed from the above, as shown in FIG. 7(a).

It is possible to replace the electromagnetic coupling portions where the direct electromagnetic coupling is achieved by the thus arranged electromagnetic coupling portions where the indirect electromagnetic coupling is achieved in any of the configurations according to the above first to fifth embodiments.

The configuration of the pressure distribution detector according to the present invention is not limited to the illustrated examples, and various modifications may be made without departing from the scope of the present invention. For example, the number of cells constituted by coil pairs is not limited to the illustrated examples and the number and arrangement thereof are not especially limited. Further, although the coils in the illustrated examples have substantially a square loop shape, coils may be formed in suitable shape as long as they can electromagnetically be coupled. Further, the materials of the spacer, cushion material, and variable electromagnetic coupling member are not limited to the above-mentioned examples as long as they can exhibit respective intended functions, i.e., function of keeping the distance between the drive coil and the detection coil, cushioning function, and function of changing the degree of electromagnetic coupling.

What is claimed is:

1. A pressure distribution detector utilizing electromagnetic coupling comprising:
   a plurality of drive wires each arranged in a looped pattern on a substrate;
   a plurality of detection wires each arranged in a looped pattern so as to be electromagnetically coupled to each of the plurality of drive wires;
   a plurality of electromagnetic coupling portions configured to allow the drive wires and the detection wires to be electromagnetically coupled to each other;
   a spacer keeping a constant distance between the plurality of drive wires and the plurality of detection wires;
   a variable electromagnetic coupling changing a degree of electromagnetic coupling at each of the plurality of electromagnetic coupling portions in accordance with a move due to pressure, which is movably provided adjacent to the plurality of electromagnetic coupling portions;
   a drive section connected to the plurality of drive wires so as to drive the plurality of drive wires; and
   a detection section connected to the plurality of detection wires so as to detect a change in the degree of electromagnetic coupling at each of the electromagnetic coupling portions from the plurality of detection wires.

2. The pressure distribution detector according to claim 1, in which the drive wires and the detection wires are each formed into a linear shape and are arranged perpendicular to each other, and
   the plurality of electromagnetic coupling portions are provided by forming a plurality of conductive plates that distances from the drive wires and the detection wires are kept constant at portions adjacent to which the drive wires and the detection wires are arranged perpendicular to each other.

3. The pressure distribution detector according to claim 1, in which the drive wires and the detection wires are each formed into a linear shape and are arranged perpendicular to each other, and
   the plurality of electromagnetic coupling portions are provided by forming a plurality of conductive plates that distances from the drive wires and the detection wires are kept constant at portions adjacent to between the driving wires and adjacent to between the detection wires.

4. The pressure distribution detector according to claim 1, in which the drive wires and the detection wires are each formed into a linear shape and are arranged perpendicular to each other, and
   the plurality of electromagnetic coupling portions are provided by forming a plurality of conductive plates that distances from the drive wires and the detection wires are kept constant at portions adjacent to the detection wires and adjacent to between the drive wires and portions adjacent to the drive wires and adjacent to between the detection wires.

5. The pressure distribution detector according to claim 1, in which the plurality of electromagnetic coupling portions comprise a plurality of drive coils each obtained by forming the drive wire into a coil-like shape and a plurality of detection coils each obtained by forming the detection wire into a coil-like shape, which are configured to be electromagnetically coupled to the plurality of drive coils in pairs, respectively.

6. The pressure distribution detector according to claim 1, in which the plurality of electromagnetic coupling portions comprise the drive wires each formed into a linear shape and a plurality of detection coils each obtained by forming the detection wire into a coil-like shape.

7. The pressure distribution detector according to claim 1, in which the plurality of electromagnetic coupling portions comprise a plurality of drive coils each obtained by forming the drive wire into a coil-like shape and the detection wires each formed into a linear shape.

8. The pressure distribution detector according to claim 5, in which the size of the plurality of drive coils is different from that of the plurality of detection coils.

9. The pressure distribution detector according to claim 5, in which the plurality of drive coils are serially connected in a predetermined direction, and
   the plurality of detection coils are serially connected in the direction perpendicular to the predetermined direction.

10. The pressure distribution detector according to claim 9, in which the plurality of drive coils and the plurality of detection coils constitute convex portions,
portions at which the respective coils are serially connected constitute concave portions, and
the convex portions and the concave portions are alternately arranged at portions between adjacent serially-connected rows of the drive coils and/or at portions between adjacent serially-connected rows of the detection coils.

11. The pressure distribution detector according to claim 9, in which the plurality of drive coils and/or the plurality of detection coils are formed into substantially a square shape and serially connected to adjacent coils at their corner portions.

12. The pressure distribution detector according to claim 1, in which the spacer is made of a substrate, and
the plurality of drive wires are provided on one surface of the substrate and the plurality of detection wires are provided on the other surface thereof.

13. The pressure distribution detector according to claim 5, in which the spacer is made of the substrate, and
the plurality of drive coils and the plurality of detection coils are provided on the same surface of the substrate.

14. The pressure distribution detector according to claim 1, the spacer has cut portions formed at portions except for portions at which the electromagnetic coupling portions are provided.

15. The pressure distribution detector according to claim 1, in which the spacer has flexibility.

16. The pressure distribution detector according to claim 1, in which the variable electromagnetic coupling is provided adjacent to the electromagnetic coupling portions via a first cushion material.

17. The pressure distribution detector according to claim 1, in which the variable electromagnetic coupling has flexibility.

18. The pressure distribution detector according to claim 1, which further comprises an electromagnetic shield formed to the side of the electromagnetic coupling portions opposite to the side at which the variable electromagnetic coupling is provided.

19. The pressure distribution detector according to claim 18, in which the electromagnetic shield is provided adjacent to the electromagnetic coupling portions via a second cushion material.

20. The pressure distribution detector according to claim 16, in which the first cushion material or second cushion material is made of polypropylene and/or polyethylene.

21. The pressure distribution detector according to claim 1, in which a plurality of the pressure distribution detectors are combined so as to detect pressure distribution.

22. The pressure distribution detector according to claim 5, which further comprises:
a plurality of reference coils electromagnetically coupled to the plurality of drive coils in pairs, respectively; and
a keeping section keeping the distance between the plurality of reference coils and the plurality of drive coils and/or distance between the plurality of reference coils and the plurality of detection coils constant,
the detection section comprising a differential amplifier for detecting a difference between the plurality of detection coils and the corresponding reference coils, respectively.

* * * * *

UNITED STATES PATENT AND TRADEMARK OFFICE
CERTIFICATE OF CORRECTION

| | |
|---|---|
| PATENT NO. | : 7,800,362 B1 |
| APPLICATION NO. | : 12/161439 |
| DATED | : September 21, 2010 |
| INVENTOR(S) | : Yasuji Ogawa |

It is certified that error appears in the above-identified patent and that said Letters Patent is hereby corrected as shown below:

Title Page, item [57] "ABSTRACT" line 1 delete "influence" after "less" and insert --influenced--.

Col. 7, line 21, please delete "TWOS" after "coil" and insert --rows--.

Col. 8, line 47, please insert --be-- after "can".

Signed and Sealed this
Eighteenth Day of October, 2011

David J. Kappos
*Director of the United States Patent and Trademark Office*